United States Patent [19]

Racine et al.

[11] Patent Number: 5,118,140
[45] Date of Patent: Jun. 2, 1992

[54] TOOL FOR SMOOTH WALL TUBES

[75] Inventors: William R. Racine; Jeffrey S. McNeil, both of Niles, Mich.

[73] Assignee: Ramer Products, Inc., Niles, Mich.

[21] Appl. No.: 743,100

[22] Filed: Aug. 9, 1991

[51] Int. Cl.⁵ .............................. F16L 17/04
[52] U.S. Cl. .................... 285/102; 285/322; 73/49.1
[58] Field of Search ............ 285/102, 306, 83, 322, 285/323, 101, 104, 105; 73/49.1

[56] References Cited

U.S. PATENT DOCUMENTS

| | | | |
|---|---|---|---|
| 2,274,753 | 3/1942 | Sundholm | 285/102 |
| 2,806,538 | 9/1957 | Conrad | 285/83 X |
| 3,695,634 | 10/1972 | White | 285/322 X |
| 3,713,675 | 1/1973 | White | 285/322 X |

FOREIGN PATENT DOCUMENTS

| | | | |
|---|---|---|---|
| 985539 | 7/1951 | France | 285/102 |
| 695656 | 8/1953 | United Kingdom | 285/102 |

*Primary Examiner*—Dave W. Arola
*Attorney, Agent, or Firm*—Robert E. Knechtel

[57] ABSTRACT

A tool to be mounted to smooth wall tubes. The tool has an entry for the tube end, a split collet member cooperating with an annular seal within the tool, and a piston or ram element which is translated to sealing by fluid pressure acting on the piston element. This force provided by the piston element causes the split collet to engage the tube and to provide the force necessary to compress the seal around the tube. The tool may be provided as a dead head, or may be coupled to a second conduit for conveying fluids therethrough.

4 Claims, 2 Drawing Sheets

TOOL FOR SMOOTH WALL TUBES

BACKGROUND OF THE INVENTION

This invention relates to a tool for mounting to the ends of smooth wall tubes, for testing compressors, condensers, evaporator coils and other refrigeration components. More particularly, it relates to such a tool which can be quickly and automatically mounted to the ends of smooth wall tubes.

Tools for mounting to the end of smooth wall tubes generally are well known in the prior art. See, for example, U.S. Pat. No. 4,447,077; 4,326,407; 4,225,159 and 4,154,465. While all of these disclosed tools are satisfactory for their intended purpose, they all fail to provide the improvements and advantages of the tool of the present invention.

For example, one advantage of the tool of the present invention is that no adjustment is required for its holding and sealing power. The tool self-adjusts to minor variations in tube OD.

Another advantage is that it uses the testing fluid to activate the internal mechanism of the tool to mount it to the end of a smooth wall tube.

Still another advantage is that all pressure must be released from the item being tested before the tool can be removed from the item. This is important to prevent accidental blow-off when attempting to remove a tool while the system is still pressurized.

A still further advantage is that the seal and internal parts can be quickly replaced or repaired without undue effort or time.

Yet another advantage is that there exists a pressure assist feature which will increase the force of the seal and split collet when test pressure is increased.

Accordingly, it is an object of the present invention to provide an improved tool for smooth wall tubes having the above defined features and advantages.

BRIEF DESCRIPTION OF THE DRAWINGS

For a fuller understanding of the nature, objects and features of the invention, reference should be had to the following detailed description taken in connection with the accompanying drawing, in which.

DESCRIPTION OF A PREFERRED EMBODIMENT

Figure 1:
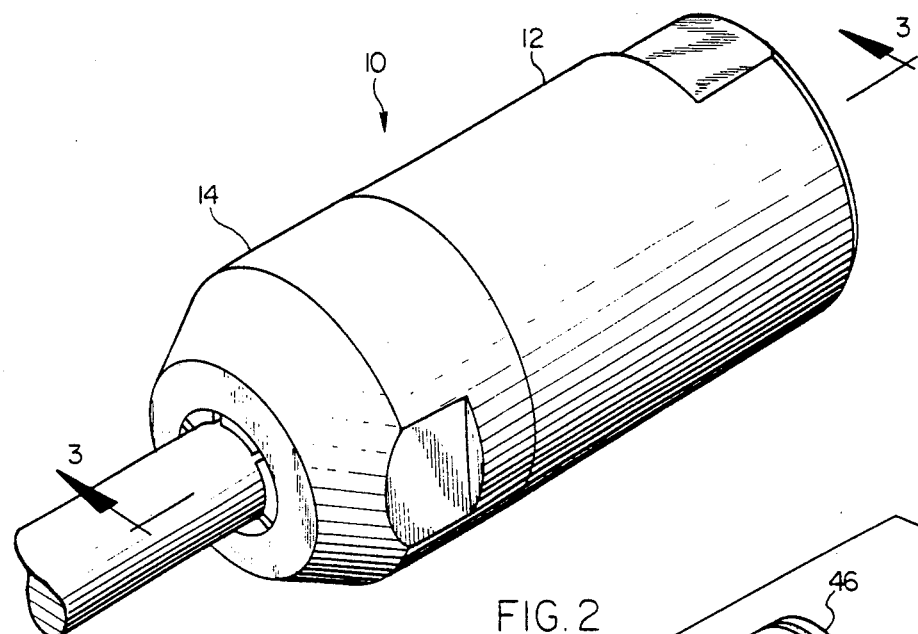
FIG. 1 is a perspective view of a tool exemplary of the invention.

Referring now to the drawing, the tool 10 includes a body 12 into which or to which is affixed a head 14. In this respect, the body 12 and the head 14 can have complimentary threads 16 for threadedly affixing them together. The head 14 has a bore 18 extending axially through it, and at its front opening the bore 18 has a tapered surface 20.

Disposed within the bore 18 are a split collet 22 and a seal 24. The split collet 22 has a tapered surface 26 which matingly engages with the tapered surface 20 at the front opening of the bore 18 to operate the split collet 22 to grip the outer diameter of a smooth wall tube, as more fully described below. The seal 24 is disposed within the bore 18 behind the split collet 22, and has a bore 28 through it for receiving therethrough the end of a smooth wall tube.

The body 12 has a cavity 30 axially formed in it, and an insert 32 is slidably disposed within the cavity 30. The insert 32 has a piston portion 34 which substantially corresponds in diameter to the diameter of the cavity 30. An 0-ring seal 34 is disposed within a seal groove 36 in the outer diameter of the piston portion 34 of the insert 32 to prevent the escape or passage of fluid or air past the insert 32, for reasons which will be obvious from the description below.

The insert 32 also has a reduced diameter portion 38 which has a cavity 40 axially formed in it. A spring 42 is disposed within the cavity 40. The end of the reduced diameter portion 38 will abut against the end of the seal 24 when the insert 32 is assembled within the tool 10 and the tool is operated. The insert 32 also has a axial bore 44 extending through it into the cavity 40. When assembled, the end of a smooth wall tube extended through the front opening of the bore 18 can engage against the spring 42. A spring 46 also is disposed within the cavity 40 to abut against the rear wall 48 of the insert 32 and against the bottom wall 50 of the cavity 40.

The body 12 also preferably and advantageously has a threaded opening 52 opening into the cavity 30, for receiving a threaded coupler for affixing to the tool a fluid or air line.

Figure 2:
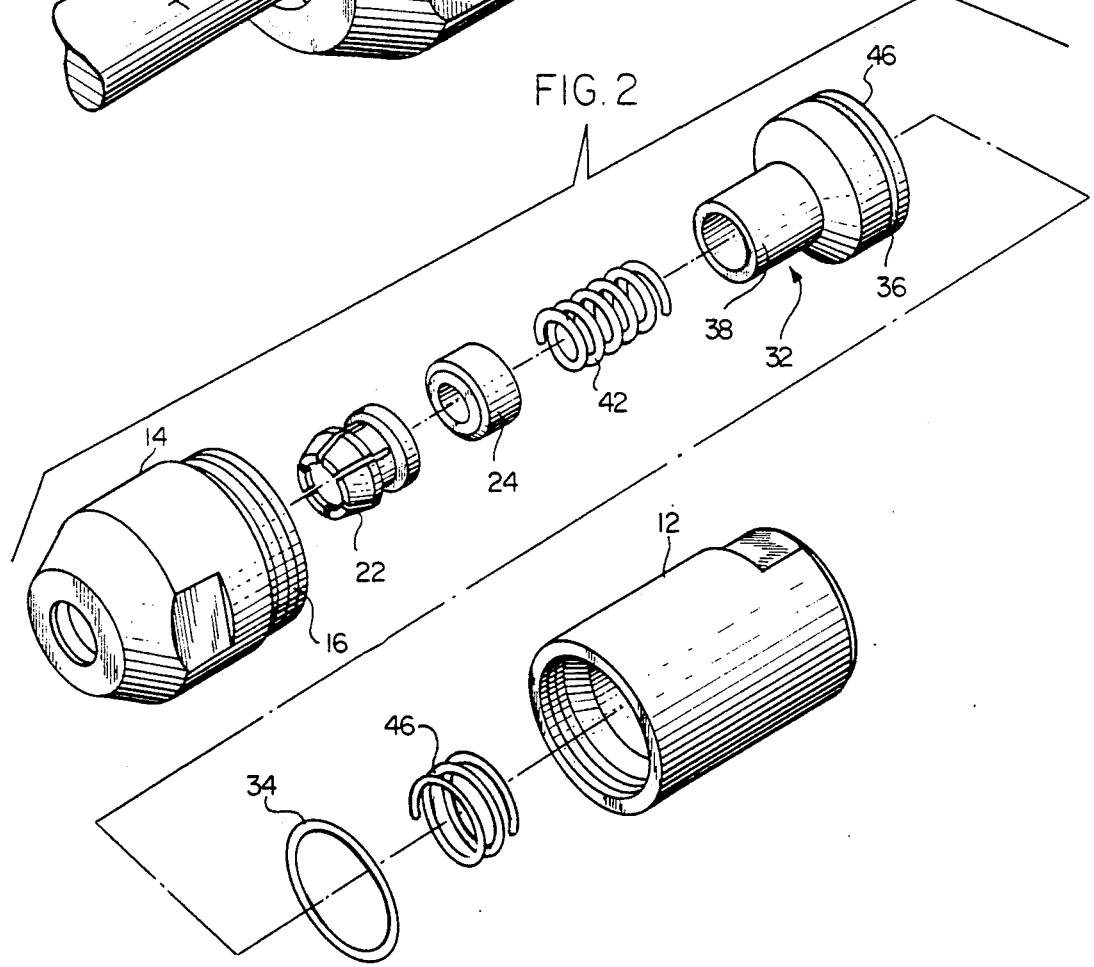
FIG. 2 is an exploded view of the tool of FIG. 1.
Figure 3:
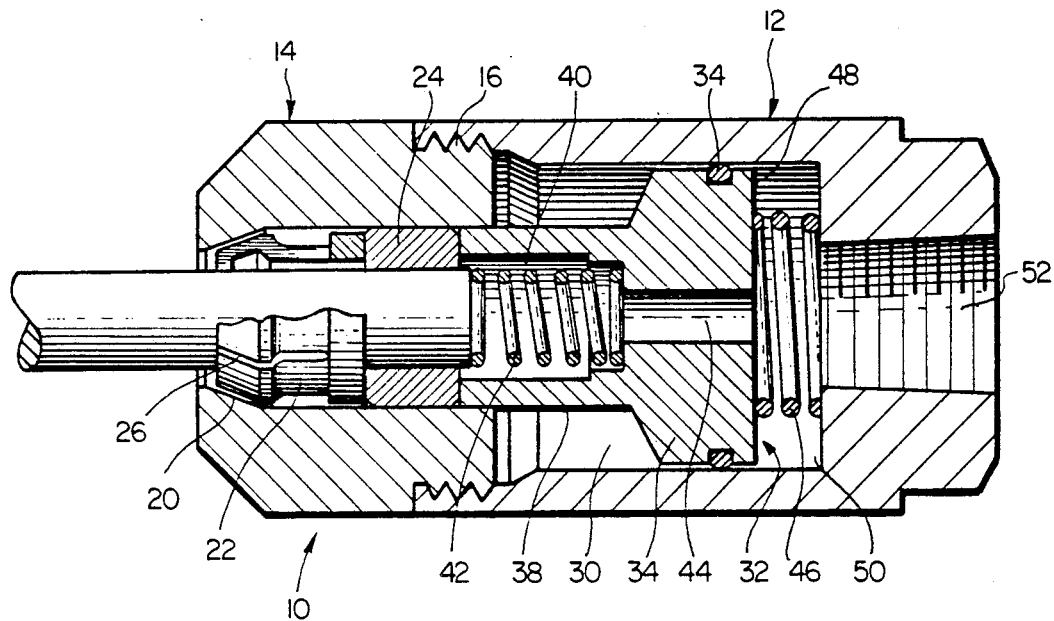
FIG. 3 is a longitudinal sectional view of the assembled tool of FIG. 1 prior to use thereof.
Figure 4:
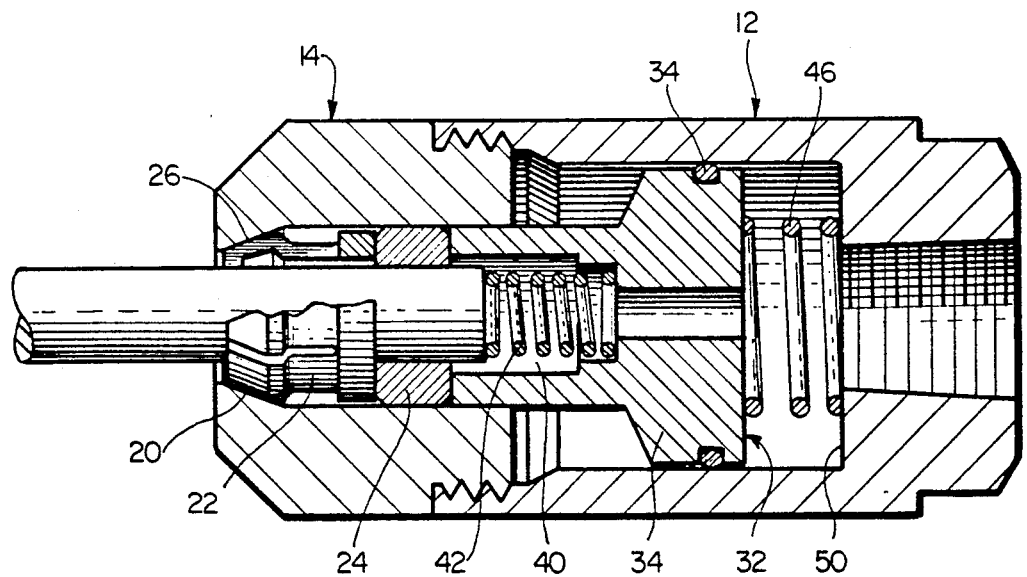
FIG. 4 is a longitudinal sectional view of the tool of FIGS. 1 and 2 attached to the end of a smooth wall tube.

The tool 10 is assembled as illustrated in FIGS. 2 and 3, with the split collet 22 and the seal 24 inserted into the head 14. The spring 46, the insert 32 with the O-ring 34 attached and the spring 42 disposed within the cavity 40 all are inserted into the body 12. The head 14 and the body 12 then are threadedly affixed together. Accordingly, it can be seen that the tool 10 can be easily and quickly assembled. Furthermore, the tool 10 can be easily and quickly disassembled to repair or replace parts.

In use, the tool is placed over the end of a smooth wall tube by inserting the end of the tube through the front opening of the bore 18 in the head 14 of the tool 10 until it abuts against the spring 42. Thereafter, if the threaded opening 52 is closed with a plug (not shown) and fluid or air under pressure caused to flow through the smooth wall tube into the tool 10, the fluid or air flows through the bore 44 into the cavity 30 in the body 12, behind the insert 32, causing the insert 32 to function like a piston forcing the end of the insert 32 against the seal 24, and the seal 24 against the split collet 22. As a result, the split collet 22 is caused to grip the outer diameter of the smooth wall tube and the seal 24 is compressed causing it likewise to grip seal against the outer diameter of the tube. It may be noted that this action is all automatic and furthermore is such that the tool 10 automatically adjusts for slight variations in tube diameter. Also, it can be seen that the greater the pressure of the test media delivered to the tool 10 the greater the gripping and sealing functions of the split collet 22 and the seal 24 become. Accordingly, the tool 10 can handle higher pressures, up to, for example, approximately 750 PSI. It also may be noted that the seal 24 seals on the outer diameter of the tube rather than its end and therefore longer seal life and lower maintenance costs result.

The tool 10 can be used, for example, to pressure test a unit by coupling a source of pressure or fluid to it, by coupling the source to the tool 10 through the opening 52 in the body 12. In this case, the tool 10 is attached to the end of a smooth wall tube by extending the end of the tube into the tool through the front opening of the bore 18 in the head 14 until it engages the spring 42. Air or fluid under pressure then is applied and as the system becomes pressurized, the insert 32 again functions as a piston and forces the seal 24 and split collet 22 into sealing and gripping positions with the tube. As the test pressure is increased, the gripping and sealing action of the split collet 22 and the seal 24 likewise increases.

In this respect, it may be noted that all pressure must be released from the item being tested before the tool 10 can be removed from the item. This feature is important to prevent accidental blow-off encountered when attempting to remove the tool while the system is still pressurized.

What is claimed is:

1. A tool for end sealing a smooth wall tube comprising:
    a housing;
    a tube entry into said housing;
    an inside taper at said tube entry;
    a split collet member positional within said housing having a bore extending through it for receiving therethrough the end of a smooth wall tube and having an outside taper which is complementary with said inside taper at said tube entry, said split collet member being operated to clamp the outside diameter of a smooth wall tube extended through it when said outside taper and said inside tapers are slidably engaged;
    an elastomeric seal positioned within said housing to engage with said split collet member and having a bore in it for receiving therethrough the end of a smooth wall tube;
    a piston member slidably disposed in said housing to engage with said seal and operated by fluid flowing into said housing to apply --an axial-- compressive force against said seal, --said axial compressive force forcing said seal against said split collet member-to force said split collet member to engage said outside taper with said inside taper to thereby cause said split collet member to clamp the outside diameter of said smooth wall tube, said axial compressive force also causing said seal to radially expand to engage said housing and said smooth wall tube to thereby create a seal about the outer diameter of said smooth wall tube and with said housing.

2. The tool of claim 1, wherein said housing comprises a tubular head threadably engaged to a tubular body whereby said internal parts of said tool can be easily removed or replaced by simply threadably separating said head and said body.

3. The tool of claim 1, further comprising an opening into said housing for receiving fluid therethrough to apply a compressive force against said seal and hence said split collet such that said seal assumes a sealing relationship with the outside diameter of the smooth wall tube and said housing and said split collet assumes a clamping relationship with the outside diameter of the smooth wall tube.

4. The tool of claim 1, wherein said piston member has a bore therein in fluid communication with fluid flowing through the smooth wall tube, whereby fluid flowing through a smooth wall tube extended into said housing through said tube entry flows through said bore in said piston member forcing said piston member to apply a compressive force against said seal and hence said split collet so that said seal assumes a sealing relationship with the smooth wall tube and said housing and said split collet member is moved into clamping relationship with the outside of the smooth wall tube.

* * * * *